3,413,135
IRON PIGMENTS AND PROCESSES FOR
PRODUCING SAME
Malcolm E. Matson, Mountain Lakes, N.J., assignor to
Allied Chemical Corporation, New York, N.Y., a corporation of New York
No Drawing. Filed July 28, 1964, Ser. No. 385,785
11 Claims. (Cl. 106—304)

ABSTRACT OF THE DISCLOSURE

Novel iron oxide pigmentary compositions are produced by contacting hydrous iron oxide with a mixture of an aromatic monocarboxylic acid and at least one fatty acid to effect transfer of the iron oxide from the aqueous phase into the organic phase. The resulting compositions are useful as colorants for synthetic organic film forming resins, particularly resins comprising acrylic polymers.

---

Hydrated iron oxides have been subjected to a variety of treatments, both physical and chemical, to condition them for use as pigments in coating compositions. One group is available as dry pigment powders to be ground into the resin binder but they are light and milky in masstone and are not transparent. In some instances they have been specially processed into binder containing pastes with somewhat improved transparency but they still lack the depth and richness of masstone to create attractive color effects when applied in a thin coating over a bright metal substrate or when used with aluminum pigment or aluminum pigment plus transparent organic pigments to produce polychromatic coatings with desirable "flop," i.e., deepness of masstone when the coated surface or panel is viewed by reflected light at an angle approaching 0° to the line of sight and brightness of shade when the panel is viewed by transmitted light at an angle approaching 90° to the line of sight. Another group usually available in the form of pigment pastes and generally referred to as "gold pastes" does have the desirable color properties but has proven to be limited in its compatibility in the ever-increasing number of synthetic resin film forming binders available to the coatings chemist. The "gold pastes" group of hydrated iron oxides treated to produce the desirable color properties of deep masstone and excellent transparency for use in the alkyd enamels, alkyd/amino enamels and nitrocellulose lacquers, for example, are not compatible with the new and important "family" of thermosetting acrylic polymers, i.e., they lose their transparency and in most cases, their deep masstone, due primarily to flocculation of the pigment in this class of resins.

It is an object of this invention to provide novel iron oxide containing pigments which are compatible with or retain their desirable color properties when incorporated into film forming synthetic resins such as thermosetting acrylic polymers, acrylic modified polymers, vinyl polymers, chlorinated rubber, styrenated alkyd resins, oxidizing oil modified alkyd resins, non-oxidizing oil modified alkyd resins, formaldehyde resins, amino-formaldehyde resins, nitrocellulose, cellulose acetobutyrate, and the like.

Another object is to devise processes for the preparation of said novel iron oxide pigments.

These and other objects of this invention are accomplished by contacting an aqueous presscake of hydrated ferric oxide with a mixture of an aromatic monocarboxylic acid, preferably benzoic acid and one or a mixture of higher fatty acids and working the resultant mixture until the iron oxide is transferred substantially completely from the aqueous phase to the organic acid phase. The resultant solid phase is separated from the aqueous phase by known means, e.g., filtration, centrifugation, and the like. The solid is dried in an oven, or by azeotropic distillation with an organic solvent, e.g., butyl alcohol, xylene and the like. The resultant pigment is dispersible in about equal parts by weight of an organic solvent or mixture of solvents, e.g., butyl alcohol, xylene, Cellosolve acetate, methyl ethyl ketone, 2-nitro propane and the like, to form a pigment paste which is readily incorporated into a wide variety of coating compositions. The resultant pigmented coating compositions including those in which an acrylic polymer is the principal film forming constituent, are characterized by deepness of masstone and excellent transparency attesting to their excellent compatibility and with the addition of aluminum pigment produce the desired polychromatic effect. When these pigmented coating compositions are subjected to exterior, e.g. Florida exposure, they exhibit excellent fastness to light and gloss retention.

The transfer of the iron oxide from the aqueous phase to the organic acid phase can be carried out in any suitable device wherein the two phases, i.e., the aqueous phase originally containing the hydrated ferric oxide and the organic acid phase containing higher fatty acids in addition to the benzoic acid, are maintained in intimate contact to permit the iron oxide to migrate ino the organic acid phase. Such devices include ball mills, pebble mills, dough mixers, high shear mixers, even ordinary kettles provided with low shear agitation, or ordinary low shear premixing in combination with stone mills, roller mills, colloid mills, or sand grinders. The time required usually is a function of the energy input. For example, whereas in a ball mill a particular batch will require from about 10 to 40 hours or more to effect a complete transfer, in a high input energy device, e.g., a Cowles dissolver or a Sweco mill, the same batch may require as little as from ½ to 5 hours. The temperature is not an important or even a critical factor. In some instances heat is developed during the process and the temperature of the batch may rise to 80° C. or higher. It is, however, not necessary to control the temperature at this stage.

The process may be carried out in the absence of an organic solvent. However, it has been observed that when such a solvent is present, the speed and completeness of the transfer of the iron oxide from the aqueous phase to the organic acid phase is enhanced. Accordingly, I prefer to operate this step of the process in the presence of an organic solvent such as butyl alcohol, amyl alcohol, toluene, xylene, methyl ethyl ketone, Cellosolve acetate, 2-nitro-propane and the like. When such a solvent or combination of solvents having an affinity for the resultant ferro organic pigment is present during the transfer of the iron oxide to the organic acid phase, the process is accelerated.

An alternate process can omit the filtration and oven drying of the hydrophobic mass. In such instances it is expedient, though not necessary, to drain off the aqueous phase from which most, if not all, of the iron oxide has been transferred, mix in additional solvent, when necessary, to form a continuous hydrophobic phase and thereafter to dry this organic acid phase containing the iron oxide intimately mixed with the organic acids and solvent by azeotropic distillation. This procedure may be modified to include the addition of a film forming portion of the end use lacquer, enamel, or ink before or after distillation of the moisture solvent mixture, but would limit its usefulness to the coating compositions tolerant of these additives.

The hydrated iron oxides that serve as starting materials for the novel pigments of my invention have been widely used in the preparation of iron oxide pigments and are well known in this art. They can be prepared by procedures also well known in this art. The basic process is given by the equation:

$$4FeSO_4 + O_2 + 8NaOH \rightarrow 2Fe_2O_3 \cdot H_2O + 4Na_2SO_4 + 2H_2O$$

The masstone and other properties can be controlled or altered by variations in the conditions of precipitation, as is well known. Details of these preparations are available in the patent and technical literature of this art, e.g., C. H. Love and J. W. Ayres, "The Iron Oxide Pigments," in Protective and Decorative Coatings, J. J. Mattiello, ed., New York, John Wiley and Sons Inc., 1942, p. 287 ff.

The higher fatty acid portion of the organic acid phase used in combination with the aromatic acid are fatty acids of four or more carbon atoms, typical of which are fatty acids derived from the saponification of vegetable oil glycerides or animals fats. Illustrative of such higher fatty acids are caproic, lauric, myristic, stearic, oleic, ricinoleic, castor oil, soya fatty acids, tallow acids and the like. The amount of organic acid combined with hydrated ferric oxide to produce these novel iron pigments can be varied over a broad range. For example, amounts of one-tenth mol of aromatic acid mixed with from five hundredths to seven-tenths mol of a higher fatty acid or a mixture of higher fatty acids will combine with one mol of hydrated ferric oxides to form pigment compositions with a wider range of compatibility in coating compositions than similar compositions prepared without an aromatic monocarboxylic acid in the organic acid phase.

The amount of aromatic acid can be increased to two mols or more for each mol of $Fe_2O_3 \cdot H_2O$ to produce novel ferro organic compounds with unusual pigmentary behavior. Superior compatibility with acrylic polymers in addition to the previously mentioned film forming binders is obtained according to my invention with organic acid phase mixtures of benzoic acid and at least a part of the higher fatty acids as ricinoleic acid, and hence such mixtures are preferred.

The aromatic monocarboxylic acid portion of the organic acid phase can be substituted or unsubstituted acids of which o-toluic acid, p-t-butylbenzoic acid, salicylic acid, m-chlorobenzoic acid, p-nitrobenzoic acid and benzoic acid are typical examples. As can be seen from these examples as well as the rest of the disclosure, including the example, only mononuclear aromatic monocarboxylic acids are contemplated. Benzoic acid because of its high degree of effectiveness in this application, its ready availability and moderate cost is the preferred member of this group.

Any of the well known organic solvents generally used in organic coating compositions can be used in the process of my invention. The greater the affinity of the solvent used for the ferro organic pigment compositions being made, the more efficient is the transfer. The more universal the solvent in more than one coating composition, the greater is its adaptability. Typical of these solvents are aliphatic hydrocarbons such as varnish makers' and painters' naphtha and mineral spirits, aromatic hydrocarbons such as toluene, xylene, and aromatic naphthas, ketones such as methyl ethyl ketone, methyl isobutyl ketone, and diisobutyl ketone, esters such as butyl acetate and Cellosolve acetate, ether alcohols such as 2-ethoxy ethanol and 2-butoxy ethanol, nitroparaffins such as nitromethane and 2-nitropropane. Mixtures of such solvents can be used and are usually preferred. The selection of the particular solvent or mixture of solvents is usually governed by the particular end use to which the pigment composition is to be put, as will be evident to those skilled in this art.

The dispersion of the novel ferro organic pigment in solvent can readily be incorporated into film forming resinous compositions of the class previously described. The resultant compositions may contain as little as approximately one percent (by weight) or as much as thirty percent of the novel ferro organic pigment. Usually, however, about two percent to about fifteen percent of said pigment is generally used. The preparation of the final coating composition is effected according to the usual practices in this art which are conventional and, hence, require no extended discussion here.

The following examples will illustrate the novel means for preparing the novel compositions of my invention. Parts and percentages are by weight unless otherwise specified.

Example 1

A mixture of 950 parts of a hydrated ferric oxide pigment presscake prepared in a conventional manner from ferrous sulfate (said presscake containing 190 parts of solids of which 58.8% was ferric iron equivalent to 177.7 parts of $Fe_2O_3 \cdot H_2O$), 31.1 parts of ricinoleic acid (acid number of 180), and 109.8 parts of benzoic acid was worked in a conventional ball mill for about 24 hours. The resultant dark brown, grainy iron pigment which readily separated from the water phase was filtered and the filter-cake was washed well with water. The washed pigment cake was dried for 16 to 24 hours in a 150° oven.

The dried material was a free-flowing powder which was spontaneously deflocculated in an equal weight or more of toluene to give a color paste which was then readily incorporated into a variety of film forming compositions to impart a clear dark brown top tone and a gold-like undertone. These compositions were extremely transparent and produced attractive gold color effects when applied over a bright, highly reflectant metallic substrate. They are suitable also for preparation of polychromatic metallic finishes with the desirable "flop," in the well known manner.

Example 2

The procedure of Example 1 was repeated using a mixture of 21.0 parts of lauric acid (acid number of 267) and 31.1 parts of ricinoleic acid in place of the 31.1 parts of ricinoleic acid. The resulting dried pigment was of comparable quality as that obtained in Example 1.

Example 3

The procedure of Example 1 was repeated using a mixture of 93.3 parts of ricinoleic acid and 244.0 parts of benzoic acid as the organic acid phase. The resultant pigment was of comparable quality to that obtained in Example 1.

Example 4

Repetition of the procedure of Example 1 with 93.3 parts of ricinoleic acid and 24.4 parts of benzoic acid as the organic acid phase, gave a pigment composition similar in all respects to that of Example 1.

Example 5

Repetition of the procedure of Example 1 with 46.7 parts of ricinoleic acid, 31.5 parts of lauric acid and 36.6 parts of benzoic acid making up the organic acid phase, gave a similar pigment composition as that obtained by the said Example 1.

Example 6

When the procedure of Example 2 was repeated using additionally 40 parts of xylene, the time required for the pigment transfer was decreased from about 24 hours to about 16 hours.

Example 7

A mixture of 950 grams of a hydrated iron oxide presscake obtained as in Example 1 was mixed in a high speed mixer, a Cowles dissolver, with 40 parts of amyl alcohol, 31.1 parts of ricinoleic acid, 21.0 parts of lauric acid, and 109.8 parts of benzoic acid for two hours after which period the iron oxide had transferred into the organic acid phase. A temperature of approximately 75° C. resulted thereby. The clear aqueous phase was drained off and the residue was washed with water. 190 parts of xylene were added and mixed in until the paste was homogeneous. The paste was dried by azeotropic distillation, cooled and was ready for incorporation into a variety of film forming compositions.

It can thus be seen that a simple and remarkably efficient process for the preparation of valuable new iron oxide pigments has been devised. These novel pigments are readily dispersible in many organic solvents commonly used in synthetic resin coating compositions and are characterized by their excellent compatibility with such synthetic resins, particularly those of the thermosetting acrylic resin class.

While the above purely illustrative examples include the best mode presently known to me for carrying out my invention, variations in the specific details set out therein are possible and will be obvious to those skilled in this art. Such variations are within the scope and spirit of this invention which is to be limited only by the appended claims.

I claim:

1. Solid iron oxide pigmentary compositions comprising hydrated ferric oxide intimately mixed with at least about 0.1 mol of a mononuclear aromatic monocarboxylic acid and at least about 0.05 mol of a higher fatty acid per mol of hydrated ferric oxide.

2. A composition according to claim 1 wherein said higher fatty acid is ricinoleic acid.

3. A composition according to claim 1 wherein said higher fatty acid is a mixture of ricinoleic acid and lauric acid.

4. Solid iron oxide pigmentary compositions comprising hydrated ferric oxide intimately mixed with at least about 0.1 mol of benzoic acid and at least about 0.05 mol of a higher fatty acid per mol of $Fe_2O_3.H_2O$.

5. Solid iron oxide pigmentary compositions comprising hydrated ferric oxide intimately mixed with between about 0.1 and about 2 mols of benzoic acid and between about 0.05 and about 0.7 mol of a higher fatty acid per mol of $Fe_2O_3.H_2O$.

6. A process for making iron oxide pigmentary compositions which consists essentially of contacting a hydrous iron oxide presscake with an organic acid mass comprising at least about 0.1 mol of a mononuclear aromatic monocarboxylic acid and at least about 0.05 mol of a higher fatty acid per mol of hydrous iron oxide, maintaining the resultant mixture in intimate contact until the transfer of the iron oxide from the aqueous phase into the acid phase is complete, and thereafter recovering the resultant composition.

7. A process of making iron oxide pigmentary compositions which comprises contacting a hydrous iron oxide presscake with an organic acid mass comprising at least about 0.1 mol of a mononuclear aromatic monocarboxylic acid and at least about 0.05 mol of a higher fatty acid per mol of hydrous iron oxide, maintaining the resultant mixture in intimate contact until the transfer of the iron oxide from the aqueous phase into the acid phase is complete, and thereafter recovering the resultant composition.

8. The process of claim 7 in which the higher fatty acid is ricinoleic acid.

9. The process of claim 7 in which the higher fatty acid is a mixture of ricinoleic acid and lauric acid.

10. A process of making iron oxide pigmentary compositions which comprises contacting a hydrous iron oxide presscake with an organic acid mass comprising at least about 0.1 mol of benzoic acid and at least about 0.05 mol of a higher fatty acid per mol of $Fe_2O_3.H_2O$, maintaining the resultant mixture in intimate contact until the transfer of the iron oxide from the aqueous phase into the acid phase is complete, draining off the aqueous phase, washing with water, adding an azeotropic solvent and drying the mass by distillation.

11. The process of claim 10 in which the azeotropic solvent is xylene.

References Cited

UNITED STATES PATENTS

| | | | |
|---|---|---|---|
| 2,232,164 | 2/1941 | Carter | 106—308 |
| 2,274,521 | 2/1942 | Berry | 106—308 |
| 2,558,302 | 6/1951 | Marcot et al. | 106—308 |
| 2,917,400 | 12/1959 | Edwards I | 106—304 |
| 3,052,644 | 9/1962 | Edwards II | 106—304 |
| 3,223,482 | 12/1965 | Puddington et al. | 106—308 |

TOBIAS E. LEVOW, *Primary Examiner.*

SAMUEL E. MOTT, *Assistant Examiner.*